US008896684B2

(12) United States Patent
Muresan et al.

(10) Patent No.: US 8,896,684 B2
(45) Date of Patent: Nov. 25, 2014

(54) VEHICLE DISPLAY ENHANCEMENTS

(75) Inventors: Adrian Valentin Muresan, Canton, MI (US); William Todd Watson, Mount Prospect, IL (US)

(73) Assignee: TK Holdings Inc., Auburn Hills, MI (US)

( * ) Notice: Subject to any disclaimer, the term of this patent is extended or adjusted under 35 U.S.C. 154(b) by 660 days.

(21) Appl. No.: 13/067,761

(22) Filed: Jun. 23, 2011

(65) Prior Publication Data

US 2011/0317002 A1  Dec. 29, 2011

Related U.S. Application Data

(60) Provisional application No. 61/358,291, filed on Jun. 24, 2010.

(51) Int. Cl.
*H04N 7/18* (2006.01)
*B62D 15/02* (2006.01)

(52) U.S. Cl.
CPC ............. *H04N 7/18* (2013.01); *B62D 15/0275* (2013.01)
USPC .......................................... 348/115; 348/118

(58) Field of Classification Search
None
See application file for complete search history.

(56) References Cited

U.S. PATENT DOCUMENTS

| 4,984,072 A * | 1/1991 | Sandrew | 348/34 |
|---|---|---|---|
| 5,949,331 A * | 9/1999 | Schofield et al. | 340/461 |
| 6,222,447 B1 | 4/2001 | Schofield et al. | |
| 6,985,171 B1 * | 1/2006 | Kuriya et al. | 348/148 |
| 7,366,595 B1 * | 4/2008 | Shimizu et al. | 701/301 |
| 2004/0085447 A1 * | 5/2004 | Katta et al. | 348/143 |
| 2006/0171704 A1 * | 8/2006 | Bingle et al. | 396/419 |
| 2007/0296865 A1 * | 12/2007 | Mino et al. | 348/571 |
| 2007/0297692 A1 * | 12/2007 | Hamatani et al. | 382/282 |
| 2008/0122606 A1 * | 5/2008 | Bradley | 340/468 |
| 2009/0174573 A1 * | 7/2009 | Smith | 340/905 |
| 2009/0262192 A1 * | 10/2009 | Schofield et al. | 348/148 |
| 2010/0034427 A1 * | 2/2010 | Fujimura et al. | 382/106 |
| 2010/0110094 A1 * | 5/2010 | Kamibayashi et al. | 345/589 |

FOREIGN PATENT DOCUMENTS

| JP | 2010-018102 | * | 1/2010 | ............. B60R 11/02 |
|---|---|---|---|---|
| JP | 2010-018102 A | | 1/2010 | |

OTHER PUBLICATIONS

International Search Report and Written Opinion for PCT/US2011/041637; issued Feb. 29, 2012; 10 pgs.

* cited by examiner

*Primary Examiner* — Jay Au Patel
*Assistant Examiner* — Reza Aghevli
(74) *Attorney, Agent, or Firm* — Foley & Lardner LLP

(57) ABSTRACT

A system and method for enhancing display content includes receiving a video signal made up of video frames from at least one image sensor and identifying a driving path based at least in part on steering wheel data. The system and method also includes performing a first segmentation on the at least one video frame to divide the at least one video frame into a plurality of segments containing input pixel data, altering input pixel data based on a segment associated with the input pixel data to create output pixel data and providing the at least one video frame comprising the output pixel data to a display.

16 Claims, 6 Drawing Sheets

VEHICLE DISPLAY ENHANCEMENTS

CROSS-REFERENCE TO RELATED APPLICATIONS

This application claims priority to and the benefit of U.S. Provisional Patent Application No. 61/358,291 filed Jun. 24, 2010. The foregoing provisional application is incorporated by reference herein in its entirety.

BACKGROUND

The present application generally relates to the field of display systems in vehicles. More specifically, the present application relates to providing visual aides to a driver of a vehicle to assist the driver in operating the vehicle.

According to various exemplary embodiments, some vehicles include a display to assist the driver operating the vehicle. The display may show a rear view with respect to the vehicle detected from a sensor placed on the exterior of the vehicle. For example, the display may be provided to a driver while the driver is operating the vehicle in reverse gear. In general, display systems have been enhanced by drawing symbols or lines to allow the driver to identify hazards, objects, driving paths, or distances while driving the vehicle. However, such alterations or markings on the image may obscure portions of the image and decrease clarity of the image. What is needed is an improved system and method for providing visual aides to a driver of a vehicle using the vehicle display system without drawing opaque symbols or lines on top of an external scene capture by a sensor.

SUMMARY

According to one exemplary embodiment, a method for enhancing display content in a vehicle includes receiving a video signal comprising at least one video frame from at least one image sensor, identifying a driving path based at least in part on steering wheel data and performing a first segmentation on the at least one video frame to divide the at least one video frame into a plurality of segments containing input pixel data. The method also includes altering input pixel data based on a segment associated with the input pixel data to create output pixel data and providing the at least one video frame comprising the output pixel data to a display.

According to another exemplary embodiment, the description includes an apparatus for enhancing display content in a vehicle comprising at least one image sensor configured to output a video signal comprising at least one video frame, a steering wheel positioning module configured to detect steering wheel data and a driving path module configured to identify a driving path based at least in part on the steering wheel data. The apparatus also includes at least one processing device configured to perform a first segmentation on the at least one video frame to divide the at least one video frame into a plurality of segments containing input pixel data, alter input pixel data based on a segment associated with the input pixel data wherein the altered pixel data are output pixel data and provide the at least one video frame comprising the output pixel data to a display.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
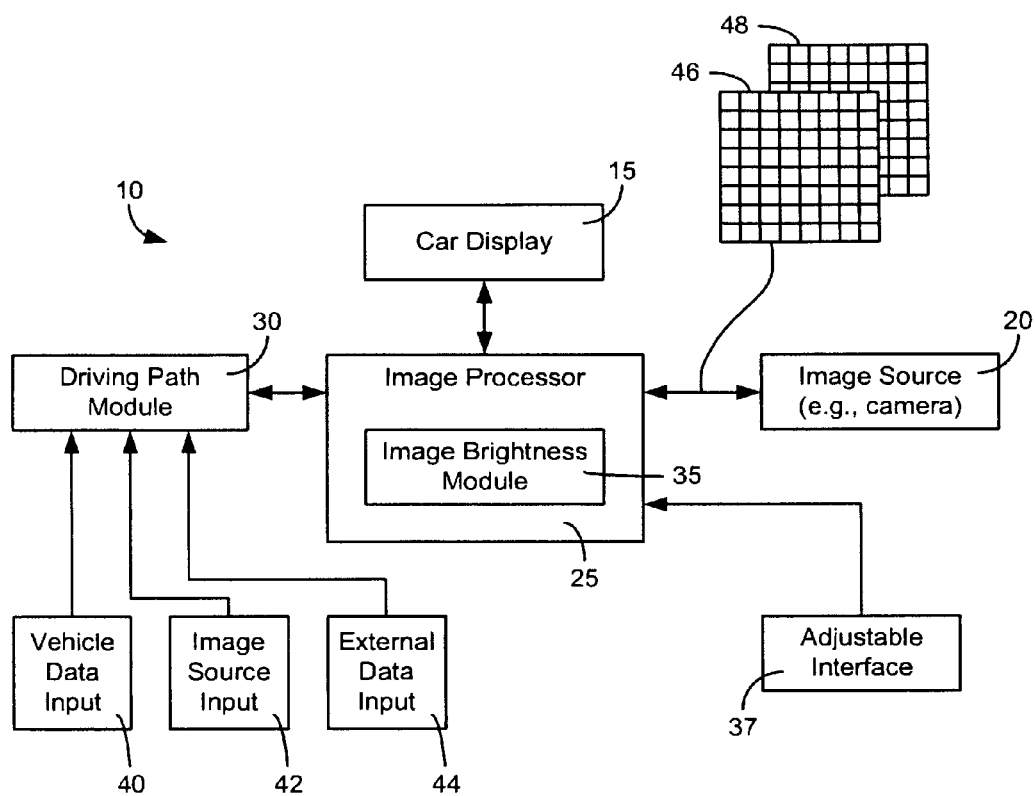
FIG. 1 is a block diagram of a vehicle display system, according to an exemplary embodiment.

Before describing in detail the particular improved system and method, it should be observed that the several disclosed embodiments include, but are not limited to a novel structural combination of conventional data and/or signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed embodiments are not limited to the particular embodiments depicted in the exemplary diagrams, but should be construed in accordance with the language in the claims.

Referring to FIG. 1, a block diagram of a vehicle display system 10 is shown, according to an exemplary embodiment. The vehicle display system 10 includes a car display 15, an image source 20, an image processor 25, and a driving path module 30. An image source 20 comprises a video camera according to one exemplary embodiment. Image source 20 may include one or multiple cameras of different types including infrared, stereoscopic or other camera types. Image source 20 detects a scene external to vehicle 610 such as the scene shown in video frame 300 and produces a video signal comprising a series of video frames such as frames 46 and 48. Frames 46 and 48 may be divided into a coordinate system that may include subsections such as macroblocks or pixels as shown in FIG. 1.

Figure 6:
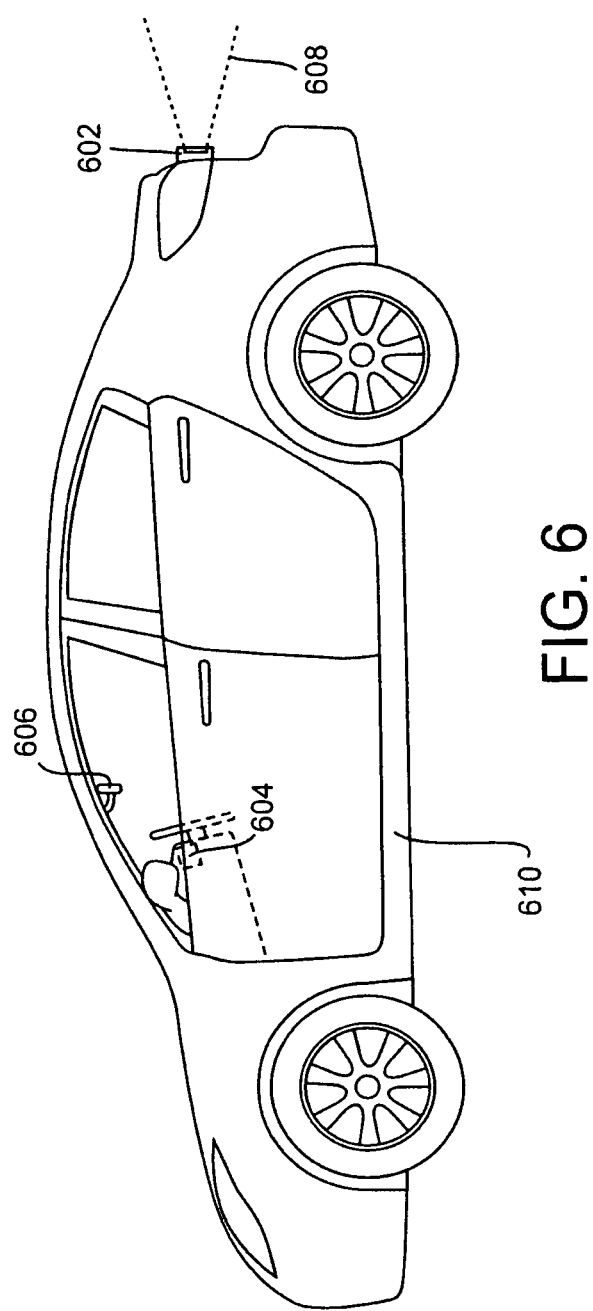
FIG. 6 is a schematic diagram of a vehicle including a rear view sensor and a display mounted in the interior of the vehicle according to one exemplary embodiment.

The pixels may be arranged in a column and row format such that each pixel has an assigned pixel coordinate (x,y) on the coordinate grid shown in frames 46 and 48. Each video frame 46 and 48 may be processed at image processor 25 according to a computer program stored in memory. After the video signal from image source 20 is processed, the processed video signal is sent to vehicle display 15 according to one embodiment. Vehicle display 15 (element 606 in FIG. 6) may display video of a scene external to the vehicle 610 showing a rear view, side view or front view. FIG. 6 depicts sensor 602 detecting a rear view external scene captured by detection area 608. The image source 20 may further provide the image processor 25 with information relating to obstacles or driving conditions. In addition, image processor 25 may be configured to detect objects in video frames 46 and 48 through object detection, line detection or other programmable detection techniques.

Referring to FIG. 6, the display system 10 may be included in the vehicle 610 for assisting driver operation of the vehicle. For example, the display system 10 as shown in FIG. 1, may process data received from sensor 602 to provide a driver with a rear view scene in display 606 when operating vehicle 610 in reverse gear, according to one embodiment. Sensor 602 may include a single camera, multiple cameras, infrared cameras, sonar, or any other type of sensor that can detect data external from vehicle 610 from image source input 42, image source 20 and external data input 44. Display system 10 may also accept data related to the operation of vehicle 610 such as steering wheel data from a steering wheel module 604, or other vehicle data such as braking data, wheel position data, gear data and the like from vehicle data input 40.

Once display system 10 receives image source input 20 and 42 that may comprise a video signal comprising a series of video frames 46 and 48, as well as vehicle data input 40 and external data input 44, image processor 25 may provide enhancements to the video signal frames 46 and 48 prior to being shown in car display 15 to a driver of vehicle 610. As shown in FIG. 6, the display 606 may be a heads-up display (HUD) to enable the driver to simultaneously view an external scene in front of vehicle 610 while also being able to view a rear view external scene captured by a sensor detection field 608 according to one embodiment.

A driver may see a rear view in display 606 that has been enhanced by processor 25 as seen in FIG. 1 in the case that display system 10 detect that vehicle 610 is in reverse gear. Seeing a rear view in display 606 may enable a driver to more clearly identify a driving path, hazards, objects, or other information. For example, display 606 may enhance video frames 46 and 48 by changing the luminance of pixels contained in various regions of the image shown in display 606.

According to one exemplary embodiment, the video signal received from sensor 602 (shown as image source 20 in FIG. 1) is enhanced by mapping a preferred or predicted driving path onto video frames 46 and 48 at image processor 25 to be displayed for a user in car display 15. The predicted or preferred driving path is identified by driving path module 30 according to one embodiment. For example, the driving path module 30 may identify a predicted driving path for a vehicle when the driver is attempting to drive the vehicle in reverse. The driving path module 30 may identify the driving path based on a variety of input data. For example, driving module 30 may receive a video frame from image source input 42 and determine a driving path based in part on the image. Furthermore, driving path module 30 may determine a driving path based on other data sources such as vehicle data input 40 or external data input 44. In one exemplary embodiment, driving path module 30 accepts steering wheel position information from steering wheel module 604 to compute a predicted driving path that the vehicle will travel.

The driving path module 30 may further determine a mode of display for the driving path. For example, the driving path may be represented as an outline of a driving path area as shown by driving path 508 in FIG. 5A, as a series of geometric shapes configured in a predetermined pattern as shown by driving path 510 in FIG. 5B or as encompassing the entire driving path area as shown by driving path 408 in FIG. 4B. According to various exemplary embodiments, identification of the driving path and a mode for displaying the identified driving path may be performed by image processor 25. Furthermore, the mode for displaying the identified driving path may be selected by a user at adjustable interface 37. Adjustable interface 37 may also be used to enter other preferences such as controlling a backlighting mechanism or otherwise altering the display brightness.

Referring again to FIG. 1, the modification of a video frame displayed in car display 15 image may include modifying the luminance component of pixel data in all or portions of the video frame. For example, the color space of a pixel contained in video frames 46 and 48 may be defined by a YUV, Y'UV, YCbCr, or other conventions wherein the Y component carries luminance data while U and V carry chrominance data. The image processor 25 may include an image brightness module 35 for such modification. Using data received from the driving path module 30 and image source 20, the image brightness module 35 may alter the luminance portion of pixel data according to a assigned frame segments. Frame segments may include a driving path segment, a non-driving path segment, a high luminance segment, low luminance segment or various other detectable segments. Luminance may be altered to increase the visibility of the driving path on display 15 by increasing the luminance of pixels contained in an identified driving path or by equalizing and lowering the luminance of pixels contained in a non-driving path segment so that the driving path segment is prominently displayed on display 15.

Brightness adjustments may be accomplished by changing the luminance or brightness of pixels in the image, by changing the backlighting or filtering of the image, by changing the duty cycle of various regions of the image, by displaying parts of the image with different intensities on a multilayer display, or otherwise. The brightness adjustments may vary based upon the display technology in the vehicle display system of the vehicle, according to an exemplary embodiment. The brightness adjustments may be performed automatically at image processor 25 according to a computer program stored in memory or manually at adjustable interface 37.

Figure 2:
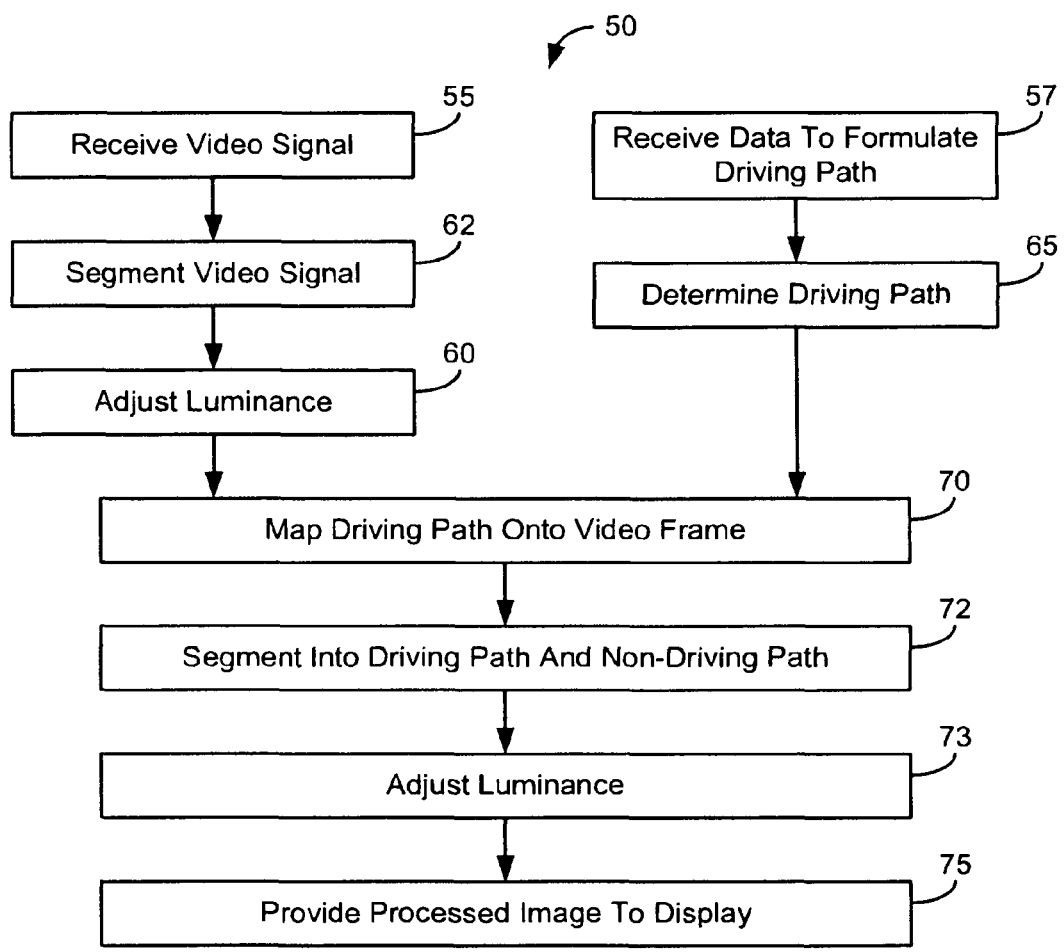
FIG. 2 is a flow chart of a method displaying an image on a vehicle display system, according to an exemplary embodiment.

Referring now to FIG. 2, a flow chart of a process 50 for processing and displaying an image on a vehicle display system is shown. It should be noted that although portions of process 50 are shown as occurring in either parallel or series, process 50 can execute component steps in either parallel or series depending on the implementation desired. Furthermore, although the process 50 of FIG. 2 depicts a specific order of method steps, the order of the steps may differ from what is depicted. For example, the image may be processed only after receiving driving path information or other information relevant to image processing, or the steps of the process 50 may be executed in any other order.

Figure 3A:
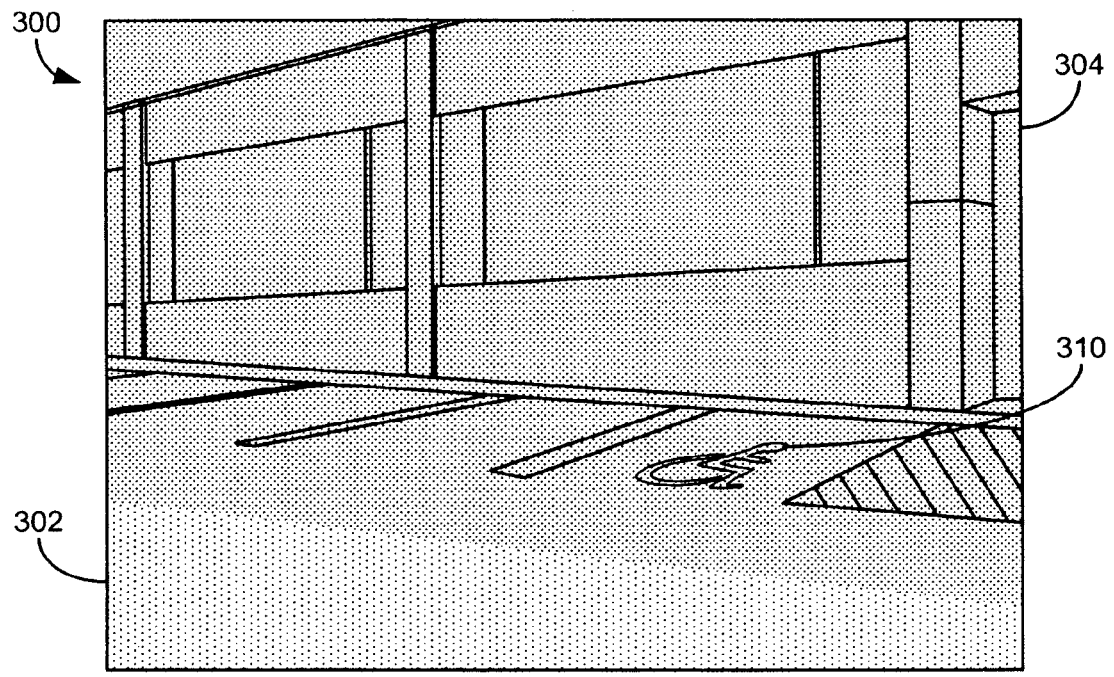
FIG. 3A is an example view of an image of a vehicle display, according to an exemplary embodiment.
Figure 3B:
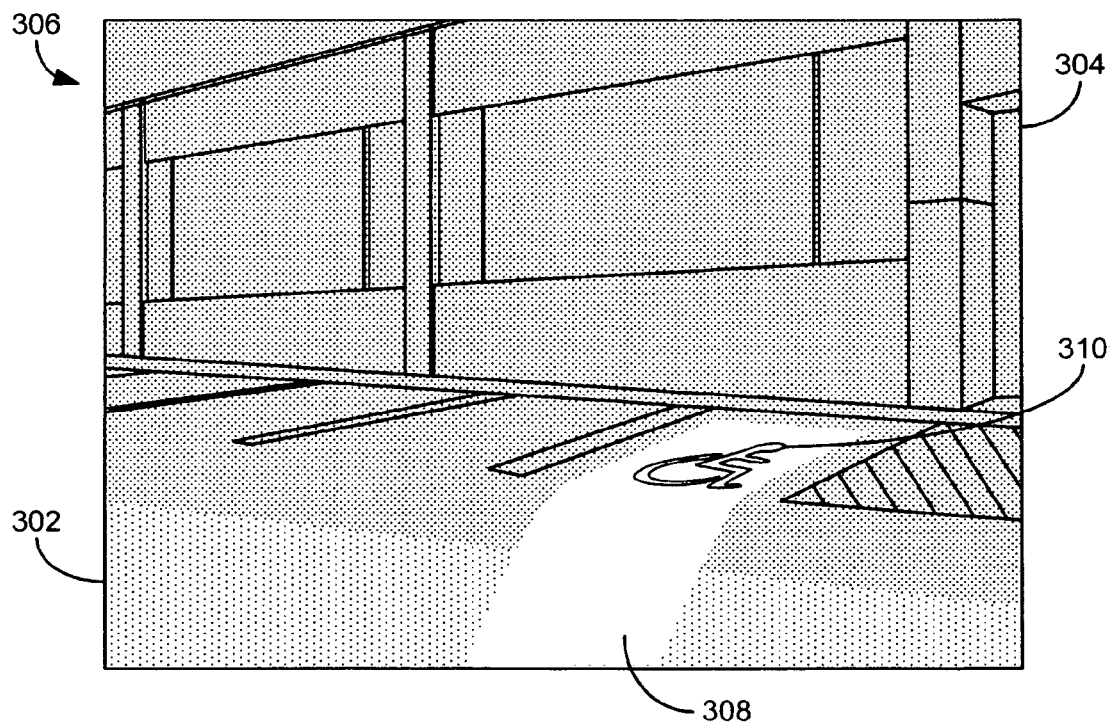
FIG. 3B is an example view of an image of a vehicle display including a driving path segment according to an exemplary embodiment.

The process 50 includes receiving a video signal from a sensor such as a camera 602 that may be attached to a vehicle 610. Once the video signal comprising a series of video frames 46 and 48 is detected, the signal may be sent to image processor 25 for segmentation at step 62. Step 62 may comprise analyzing a video frame 46 and dividing the video frame into segments based on luminance thresholds. For example, FIG. 3A includes a segment 302 of video frame 300 that is noticeably brighter than segment 304. Step 62 may determine segment 302 is above a particular brightness threshold and should therefore be included in a distinct luminance segment according to one embodiment. There may be any number of brightness thresholds with a corresponding number of possible luminance segments depending on the desired level of luminance control. According to one embodiment, one or more functions may be used to determine if the image needs to be adjusted for brightness gradients in the original image and therefore separated into various luminance segments. If a particular video frame does not contain a high degree of brightness gradients, then steps 62 and 60 may be omitted according to some embodiments.

Once a frame 300 has been divided into luminance segments, step 60 may adjust the luminance in each of the luminance segments to create a uniform luminance within a particular upper and lower luminance value. For example, if the luminance component of pixels in a video frame can have a value of between 0 and 255, step 60 may limit the pixel luminance in a particular video frame to between 100 and 150 according to one embodiment. Furthermore, if it is predetermined there will be four luminance segments having assigned pixel values of 0-64, 65-128, 129-192 and 193-255, respectively, step 60 may limit the luminance in a particular video frame to a single luminance segment or two luminance segments such as the 65-128 and 129-192. Doing so may lower the overall luminance variation to further accentuate an illuminated driving path shown on display 15 according to one exemplary embodiment. In addition to limiting the boundary of luminance values in a given frame, step 60 may also determine a specific distribution of luminance values in a given frame. For example, step 60 may determine that the distribution of luminance values in frame 300 must be according to a predetermined function such as a Gaussian function. Furthermore, step 60 may alternatively be combined with step 72 so that all video frame segmentation occurs in a single step.

Figure 4A:
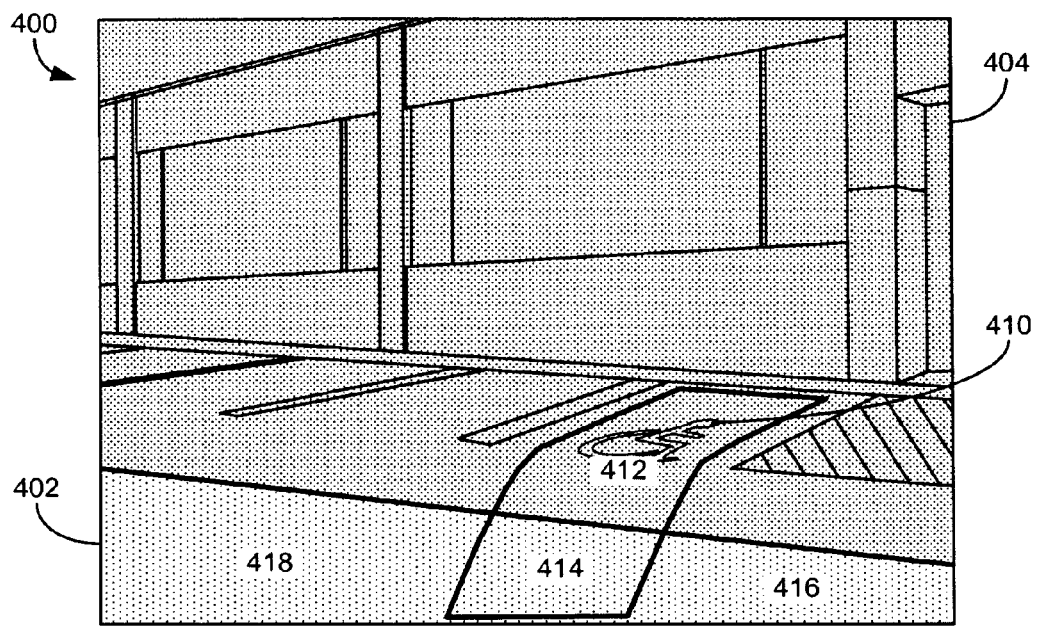
FIG. 4A is a schematic diagram depicting various luminance segments before adjusting luminance.
Figure 4B:
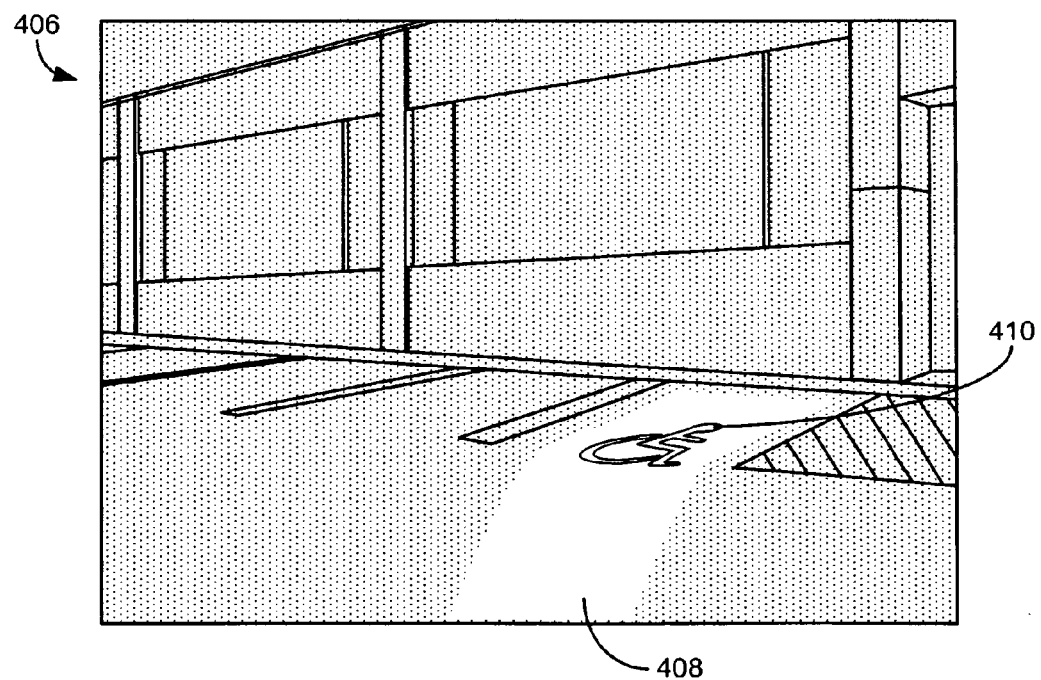
FIG. 4B is an example view of an image of a vehicle display depicting various luminance segments after adjusting luminance.

The process 50 further includes indicating a driving path at step 65. The driving path may be calculated based on various inputs received at step 57 including vehicle data input 40 such as steering wheel position and gear selected (including forward, reverse and neutral gears), image source input 42 such as a video signal that may be the same video signal 20 provided to image processor 25, and external data input 44 such as sonar or other external data. Once a driving path is identified at step 65, the identified driving path is mapped onto a video frame at step 70. Step 70 may include converting the driving path data to a data format compatible with the video frame format at image processor 25 according to one embodiment. The mapping of an indicated path at step 70 may include selecting pixels of data in a video frame 406 that correspond to the location of the identified path such as pixels contained in path 408 as shown in FIG. 4B.

Once a driving path has been mapped onto the video frame of a video signal at step 70, the video frame may be segmented into driving path and non-driving path portions. For example, in FIG. 4A, a video frame is shown according to one embodiment where the luminance segmenting of step 62 and the driving path segmenting in step 72 both take place after the driving path has been mapped onto the video frame at step 70. As such, video frame 400 is divided into both luminance and driving path segments. For example, segments 412 and 414 are both driving path segments, while segments 402 is a high luminance segment and section 404 is a low luminance segment. Segment 416 is an example of a non-driving path segment. Accordingly, video frames recorded by a camera and provided to a vehicle display system may have inconsistent brightness levels. Such a variance may be created because of shadows, ambient light, or other factors.

Once the frame 400 has been segmented at step 72, the luminance of the path segment versus non-path segment can be adjusted by brightness module 25 to produce a frame of output pixels shown in frame 406. At step 73, the relative luminance of driving path segment 408 may be altered either by increasing the luminance of input pixels in driving path segment 408, decreasing the luminance of pixels in the non-driving path segment (shown in FIG. 4B as the entire area outside segment 408), or a combination of both, according to one example. As seen in the transition between FIG. 4A and FIG. 4B, all input pixels associated with non-driving path segments have been have been equalized such that separate luminance segments have been eliminated. As can be seen in FIG. 4B, this causes the output pixels in driving path segment 408 to have a greater contrast with respect to the entire non-driving path segment surrounding it.

Furthermore, it is important to note that the luminance value of output pixels contained in both the driving path and non-driving path may be distributed in the driving path or non-driving path according to a predetermined function such as a Gaussian function. According to one exemplary embodiment, the average luminance of output pixels in the driving path is higher than the average luminance of output pixels in the non-driving path as shown in FIG. 4B. Furthermore, the driving path region may brightened by a constant factor and the rest of the image is darkened by a constant factor according to another exemplary embodiment. The brightness levels may be chosen or calculated such that visual features of the image are not obscured by providing a brightness level for non-driving path segments that allow for discernment of various objects detected by sensor 602. For example, generally referring to FIGS. 3A-5B, a handicapped parking symbol is shown in the driving path as not being obscured due to various adjustments to brightness levels.

Once the output pixels in the video frame have been adjusted at brightness module 25, the video frame is then forwarded to display 15 (also seen as display 606 in FIG. 6) to be displayed for a user such as a driver. This process may be carried out for each frame in a video signal. The rate that at which individual video frames are provided to display 15 may depend on image processor 25, image source 20 or driving path module 30 but may for example, be at a rate of 30 frames per second.

In addition, the predetermined functions stored in memory and executed by image processor 25 may vary the output pixel luminance contained in a video frame with respect to time so that successive video frames in a video signal sent to display 15 will vary in pixel luminance by a predetermined amount over time. Such a temporal variation in luminance can result in a visual effect on display 15 to further distinguish the driving path from the rest of the image. For example, within the driving path, a ripple effect or pattern may be displayed on display 15 using the predetermined function to vary the luminance of pixels contained in the driving path segment. Such functions may be used to prevent a driver from losing track of the driving path because of visual display noise (e.g., if a lighting condition suddenly changes for the camera capturing the images).

Figure 5A:
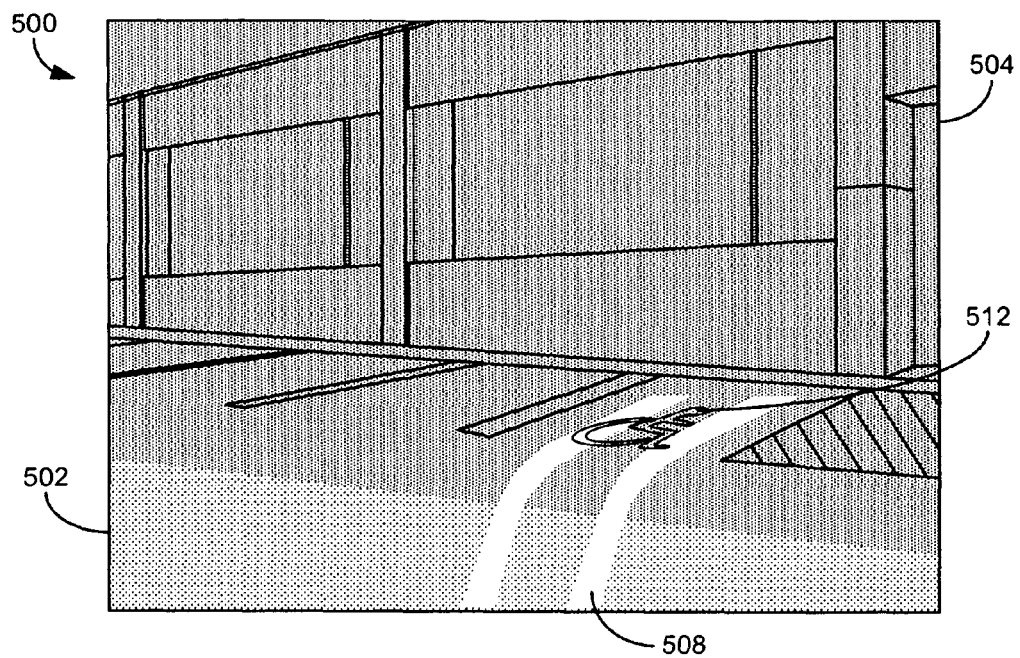
FIG. 5A is an example view of an image of a vehicle display depicting a driving path according to one embodiment.
Figure 5B:
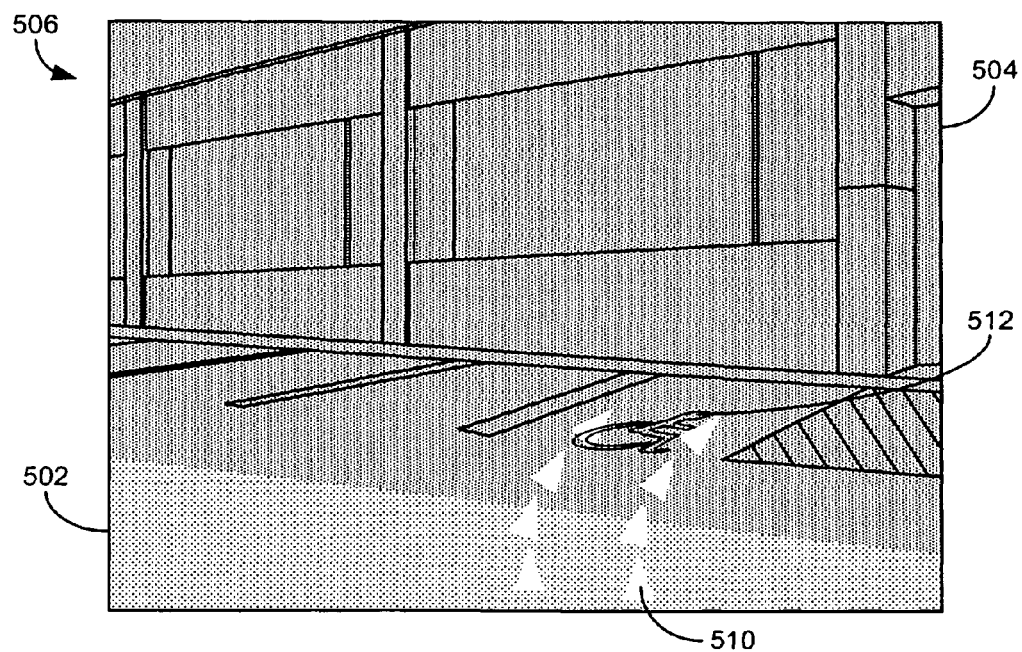
FIG. 5B is an example view of an image of a vehicle display depicting a driving path according to one embodiment.

Furthermore, the objective of highlighting a driving path in an image may also be accomplished by modifying the luminance or brightness along the driving path's periphery, outline, or center instead of illuminating the entire driving path region. For example, while in FIG. 3B the driving path 308 is shown as a continuous segment of pixels covering the width of a vehicle, for example, the driving path may be represented by a plurality of distinct segments of pixels such as arrows, circles, stars, rectangles, other geometric shapes or patterns, or otherwise. Referring to FIG. 5A, an outline of the driving path is brightened compared to the rest of the image, and referring to FIG. 5B, arrows identifying the driving path and the direction in which the vehicle should travel are shown brightened compared to the rest of the image.

Each shape may have its own time and/or space varying functions indicating characteristics such as brightness, size, and location. For example, the brightness of the arrows in the image of FIG. 5B may be changed at such a rate that indicates the backing speed of the vehicle or a distance to an identified hazard or object in the driving path or the final destination.

It is important to note that the construction and arrangement of the display system shown in the various exemplary embodiments are illustrative only. Those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

Additionally, each processor disclosed in the various Figures may be any electronic data processing unit which executes software or source code stored, permanently or temporarily, in a digital memory storage device or computer-readable media including, but not limited to, FPGA, RAM, ROM, CD, DVD, hard disk drive, diskette, solid-state memory, PCMCIA or PC Card, secure digital cards, and compact flash cards or other non-transitory computer medium. A common example of an electronic data processing unit is a microprocessor digital signal processor, video processor or other computing device, however, for the embodiments herein, the term processor is not limited to the microprocessor, digital signal processor or video processor and its meaning is not intended to be construed narrowly. In addition, a processor or digital signal processor could also consist of more than one electronic data processing units.

Furthermore, the embodiments disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A method for enhancing display content in a vehicle comprising:
    receiving a video signal comprising at least one video frame from at least one image sensor;
    identifying a driving path based at least in part on vehicle data;
    performing a first segmentation on the at least one video frame to divide the at least one video frame into a plurality of segments containing input pixel data;
    altering input pixel data based on a segment associated with the input pixel data to create output pixel data; and
    providing the at least one video frame comprising the output pixel data to a display,
    wherein the input pixel data comprises pixel luminance, and
    wherein altering input pixel data comprises
        altering the input pixel luminance to create a distribution of output pixel luminance for all pixels contained in at least one driving path segment according to a predetermined function, and
        altering the input pixel luminance to create a distribution of output pixel luminance for all pixels contained in a non-driving path segment according to a predetermined function.

2. The method of claim 1, wherein performing the first segmentation comprises dividing the at least one video frame into the non-driving path segment and the at least one driving path segment.

3. The method of claim 2, further comprising performing a second segmentation that divides the at least one video frame into luminance segments based on luminance thresholds.

4. The method of claim 3, wherein altering input pixel luminance results in all output pixel luminance contained in non-driving path luminance segments being adjusted between an upper and lower luminance value.

5. The method of claim 1, wherein the predetermined function is a Gaussian function.

6. The method of claim 1, wherein an average output pixel luminance in the at least one driving path segment is higher than an average output pixel luminance in the non-driving path segment.

7. The method of claim 2, wherein an average output pixel luminance in the at least one driving path segment is altered with respect to time in a predetermined manner such that the average output pixel luminance in the at least one driving path segment in a first video frame provided to the display differs from an average output pixel luminance in the at least one driving path segment in a temporally subsequent video frame provided to the display by a predetermined amount.

8. The method of claim 2, wherein the at least one driving path segment is a single continuous segment of pixels with a perimeter.

9. The method of claim 2, wherein the at least one driving path segment comprises a plurality of distinct continuous segments of pixels formed in a predetermined pattern.

10. The method of claim 1, wherein the image sensor is a video camera mounted on an exterior of the vehicle to capture a rear view and the display is heads up display mounted in an interior of the vehicle.

11. The method of claim 1, wherein the vehicle data comprises steering data.

12. An apparatus for enhancing display content in a vehicle comprising:
    at least one image sensor configured to output a video signal comprising at least one video frame;
    a steering wheel positioning module configured to detect vehicle data;
    a driving path module configured to identify a driving path based at least in part on the vehicle data;
    at least one processing device configured to:
        perform a first segmentation on the at least one video frame to divide the at least one video frame into a plurality of segments containing input pixel data, the input pixel data comprising pixel luminance;
        alter input pixel data based on a segment associated with the input pixel data wherein the altered pixel data are output pixel data, wherein altering input pixel data comprises
            altering the input pixel luminance to create a distribution of output pixel luminance for all pixels contained in at least one driving path segment according to a predetermined function, and altering the input pixel luminance to create a distribution of output pixel luminance for all pixels contained in a non-driving path segment according to a predetermined function; and provide the at least one video frame comprising the output pixel data to a display.

13. The apparatus of claim 12, wherein performing the first segmentation comprises dividing the at least one video frame into the non-driving path segment and the at least one driving path segment.

14. The apparatus of claim 13, wherein an average output pixel luminance in the at least one driving path segment is higher than an average output pixel luminance in the non-driving path segment.

15. The apparatus of claim 14, wherein the at least one driving path segment comprises a plurality of distinct continuous segments of pixels formed in a predetermined pattern.

16. The apparatus of claim 12, wherein the image sensor is a video camera mounted on an exterior of the vehicle to capture a rear view and the display is heads up display mounted in an interior of the vehicle.

* * * * *